(12) United States Patent
Farmiga et al.

(10) Patent No.: US 7,075,660 B2
(45) Date of Patent: Jul. 11, 2006

(54) MULTI-BEAM PROBE WITH ADJUSTABLE BEAM ANGLE

(75) Inventors: Nestor O. Farmiga, Rochester, NY (US); Jack W. Frankovich, Fairport, NY (US)

(73) Assignee: Corning Incorporated, Corning, NY (US)

( * ) Notice: Subject to any disclaimer, the term of this patent is extended or adjusted under 35 U.S.C. 154(b) by 309 days.

(21) Appl. No.: 10/716,368

(22) Filed: Nov. 18, 2003

(65) Prior Publication Data

US 2005/0107184 A1    May 19, 2005

(51) Int. Cl.
G01B 9/02 (2006.01)
G01N 21/00 (2006.01)

(52) U.S. Cl. .................................... 356/511; 356/241.1

(58) Field of Classification Search ................ 356/516, 356/511, 489, 512, 513, 514, 495, 497, 241.1, 356/237.2; 250/599.22
See application file for complete search history.

(56) References Cited

U.S. PATENT DOCUMENTS

| 6,462,815 B1 * | 10/2002 | Drabarek et al. ......... 356/241.1 |
| 6,781,699 B1 * | 8/2004 | Dunn et al. ................. 356/511 |
| 2004/0075842 A1 | 4/2004 | Dunn et al. ................. 356/511 |

* cited by examiner

Primary Examiner—Gregory J. Toatley
Assistant Examiner—Marissa J Detschel
(74) Attorney, Agent, or Firm—Timothy M. Schaeberle

(57) ABSTRACT

Compound surfaces of a test object are interferometrically measured by a multi-beam probe. One of two measuring beams emerges from the probe at a fixed angle for measuring one of the compound surfaces, and the other measuring beam emerges from the probe at a variable angle for measuring a plurality of other compound surfaces.

40 Claims, 5 Drawing Sheets

MULTI-BEAM PROBE WITH ADJUSTABLE BEAM ANGLE

BACKGROUND OF THE INVENTION

1. Field of the Invention

Within the field of interferometry, particularly for measuring manufactured components, optical probes position beams for scanning surfaces of the components. The probes direct measuring beams to points on the component surfaces, and relative motion between the probes and the components provides for measuring areas of the component surfaces.

2. Description of Related Art

Optical probes provide a non-contact means for surface form and geometrical measurement of test objects, particularly manufactured components. Typically, measuring beams directed from optical probes retroreflect from component surfaces and are returned for analysis by an interferometer. Conventional practice locates the optical probes within a test arm of the interferometer, and measuring beams returned from the test arm are combined with reference beams returned from a reference arm to compare their lengths of optical travel.

Relative motion between the optical probes and the test objects scans the measuring beam across the surfaces of test objects to acquire information about different points on the surfaces. The relative motion, which can involve rotation or translation, tracks paths that are parallel to the surfaces so that changes in length differences between measuring and reference beams can be interpreted as deviations from the expected form of the component surfaces.

For measuring rotational surfaces (i.e., surfaces of revolution), the optical probe can be translated and the test object can be rotated. The measuring beam from the optical probe is focused onto the test surface at a given radius with respect to the center of rotation of the test object. Rotation of the test object enables the measuring beam to scan a circumference of the test object. Subsequent translations of the optical probe in an axial plane of test object rotation allow the remainder of the rotational surface to be scanned.

The measurement of compound surfaces of test objects presents special challenges, particularly when the measurements are intended for deriving relative information between the compound surfaces. For example, compound rotational surfaces of test objects can be compared for concentricity and runout. An optical probe effective for these purposes is disclosed in co-assigned U.S. patent application Ser. No. 10/277,798, entitled "Two-wavelength Confocal Interferometer for Measuring Multiple Surfaces", which is hereby incorporated by reference.

The disclosed optical probe splits a measuring beam into two measuring beam portions that are directed from the probe to different points of focus through different angles of inclination normal to two compound surfaces of a test object. Both beam portions are focused by the same focusing optics prior to their split. However, a beamsplitter reflects one of the converging beam portions in a first direction from the probe. A prism deflects the remaining converging beam portion in a second direction from the probe. The probe geometry and scan path are chosen such that only one beam is focused onto the surface being measured. Confocal imaging then ensures that signal from only this beam is obtained.

Both the relative orientation and the number of compound surfaces requiring measurement can vary among test objects. Constructing optical probes unique to each such situation is expensive and requires remounting and re-calibrating probes to measure the differently oriented compound surfaces.

BRIEF SUMMARY OF THE INVENTION

Our invention features a new probe for measuring compound surfaces of test objects by measurement of optical interference. Multiple beams are directed from the probe at different angles for measuring compound surfaces that are variously inclined to the probe. Alternative or additional surfaces can be measured by directing one or more of the beams at different angles from the probe. The invention employs the protection of non-contact measurement and the accuracy of interferometric measurement, while contributing additional flexibility for measuring alternative or additional surfaces with the same probe.

One example of our multi-beam probe for interferometrically measuring compound surfaces of a test object includes a probe body having a reference axis. A beamsplitter divides a beam into first and second measuring beams propagating within the probe body. A first deflector directs the first measuring beam from the probe body at a given angle with respect to the reference axis for measuring one of the compound surfaces. A second deflector directs the second measuring beam from the probe body at one of a plurality of variable angles with respect to the reference axis for measuring another of the compound surfaces. A beam adjuster associated with the second deflector changes the variable angle between (a) a first variable angle at which the second measuring beam is directed from the probe body for measuring a second of the compound surfaces, and (b) a second variable angle at which the second measuring beam is directed from the probe body for measuring a third of the compound surfaces.

The beam adjuster preferably includes an indexing mechanism for changing the variable angles. For example, the indexing mechanism can be arranged to intermittently index the second deflector between variable angles by a discrete increment or to continuously index the second deflector between variable angles through a continuum of increments.

The second deflector preferably includes a deflector body that is rotatable about an indexing axis for successively deflecting the second measuring beam through the first and second variable angles. The indexing axis can extend in various directions but is preferably either parallel or perpendicular to the reference axis of the probe. In the latter case, the variable angle is preferably adjustable within an axial plane that includes the reference axis.

The second deflector also preferably includes one or more reflective facets for reflecting the second measuring beam through the variable angles. For example, a first facet can be arranged for reflecting the second measuring beam through the first variable angle, and a second facet can be arranged for reflecting the second measuring beam through the second variable angle. The beam adjuster preferably moves the adjuster body between successive positions at which the second measuring beam is reflected from the first and second reflective facets. Additional reflective facets can be used to reflect the second measuring beam through other variable angles, and the beam adjuster can be used to move the adjuster body through other successive positions at which the second measuring beam is reflected from the additional reflective facets.

The probe also preferably includes focusing optics associated with the first and second measuring beams for focusing the first and second beams on the compound surfaces of the test object. A common focusing optic can be used for focusing both measuring beams, or separate focusing optics can be used for individually focusing the first and second measuring beams.

Another example of our new multi-beam probe can be described as having a probe body with separate optical pathways for propagating first and second measuring beams. Focusing optics separately focus the first and second measuring beams beyond the probe body for measuring different compound surfaces of the test object. An adjustable beam deflector inclines the second measuring beam with respect to the first measuring beam through a range of angles for measuring more than one of the compound surfaces with the second measuring beam.

The adjustable beam deflector preferably includes a deflector body that is movable between successive positions that incline the second measuring beam through different angles with respect to the first measuring beam. The deflector body preferably supports a plurality of reflective facets that are inclined with respect to each other, each of the facets providing for reflecting the second measuring beam at one of the different angles.

As a part of an indexing mechanism, the deflector body is preferably supported in a kinematic mount for constraining motion of the deflector body in three orthogonal directions of rotation and three orthogonal directions of translation. However, one of the constraints of motion is suspended to permit the deflector body to be indexed between positions at which different reflective facets reflect the second measuring beam. The deflector body can be a disk that is rotatable about an indexing axis, and the facets can be formed as reflective surfaces of the disk.

The first and second measuring beams propagate through the probe body with respect to a reference axis. A fixed deflector preferably inclines the first measuring beam with respect to the reference axis. As such, the first measuring beam can be inclined through a fixed angle in an axial plane that includes the reference axis, and the second measuring beam can be inclined through the range of angles in the same axial plane.

The adjustable beam deflector preferably includes a deflector body that is removable from the probe body and re-mountable within the probe body in a different angular orientation for changing the inclination of the second measuring beam through different angles with respect to the first measuring beam. The deflector body preferably supports a plurality of reflective facets that are inclined with respect to each other, and the deflector body is re-mountable within the probe body in different orientations that present different reflective facets to the second measuring beam.

The multi-beam probe is primarily intended for use in interferometric measuring systems for measuring compound rotational surfaces of a test object. Within an example of such a system, a rotatable test object support rotates the test object about a rotational axis. The multi-beam probe focuses first and second measuring beams on different compound rotational surfaces of the test object. Beam directional optics within the multi-beam probe incline the first and second measuring beams with respect to the rotational axis for measuring a first and second of the compound rotational surfaces. An adjustment mechanism within the multi-beam probe varies the inclination of the second measuring beam with respect to the rotational axis for measuring a third of the compound rotational surfaces.

Preferably, focusing optics focus the first measuring beam on the first compound rotational surface at normal incidence and successively focus the second measuring beam on the second and third compound rotational surfaces at normal incidence. The adjustment mechanism preferably includes an indexing mechanism for changing the inclination of the second measuring beam with respect to the rotational axis. For maintaining a desired relationship between the separate measures taken by the first and second measuring beams, the indexing mechanism preferably changes the inclination of the second measuring beam with respect to the rotational axis within a plane that includes the rotational axis.

A scanning mechanism is preferably used to translate the multi-beam probe with respect to the test object to scan (e.g., by sampling) areas of the compound test surfaces. For example, the scanning mechanism preferably includes a first drive for relatively moving the probe parallel to the rotational axis of the test object and a second drive for relatively moving the probe perpendicular to the rotational axis. The relative motions are preferably within the same axial plane in which the first and second measuring beams are relatively inclined, which is particularly useful for measuring surfaces of revolution.

A processor preferably processes information from the first measuring beam about the first compound rotational surface for determining a datum axis of the test object and processes information from the second measuring beam for referencing information about the second and third compound rotational surfaces with respect to the datum axis. The datum axis is expected to differ somewhat from the rotational axis. The processor compares phase information between the first and second measuring beams and a common reference beam.

Generally, a Michelson or Twyman-Green type interferometer configuration is preferred. As such, a common starting beam is split between measuring and reference arms. The probe is located along the measuring arm, and the first and second measuring beams are preferably oriented normal to respective compound surfaces so that the measuring beams are retroreflected by the compound surfaces. A reflective optic returns the reference beam from the reference arm for recombining with both measuring beams.

Our preference is for the first and second measuring beams to be separately combined with the reference beam. For example, a first measurement can be taken by combining the first measuring beam with the reference beam for measuring a first compound surface. Second and subsequent measurements can be taken by combining the second measuring beam with the reference beam for measuring second and higher-numbered compound surfaces. The measurements can be distinguished by a confocal imaging system in which only one or the other of the two measuring beams is sufficiently focused on a surface of the test object to be effectively recombined with the reference beam.

The choice of beam wavelength can be based on a number of factors including the cost of components and the reflectivity and condition of the test surfaces. For measuring rough surfaces or for expanding the range of measurement, the beam (i.e., measuring and reference beam) can be composed of two or more peak wavelengths, each capable of producing an interference pattern but combinable within the same interference pattern or by an addition of separate interference patterns to provide unique measurements over a wider range of surface variation.

BRIEF DESCRIPTION OF THE SEVERAL VIEWS OF THE DRAWING(S)

DETAILED DESCRIPTION OF THE INVENTION

Figure 1:
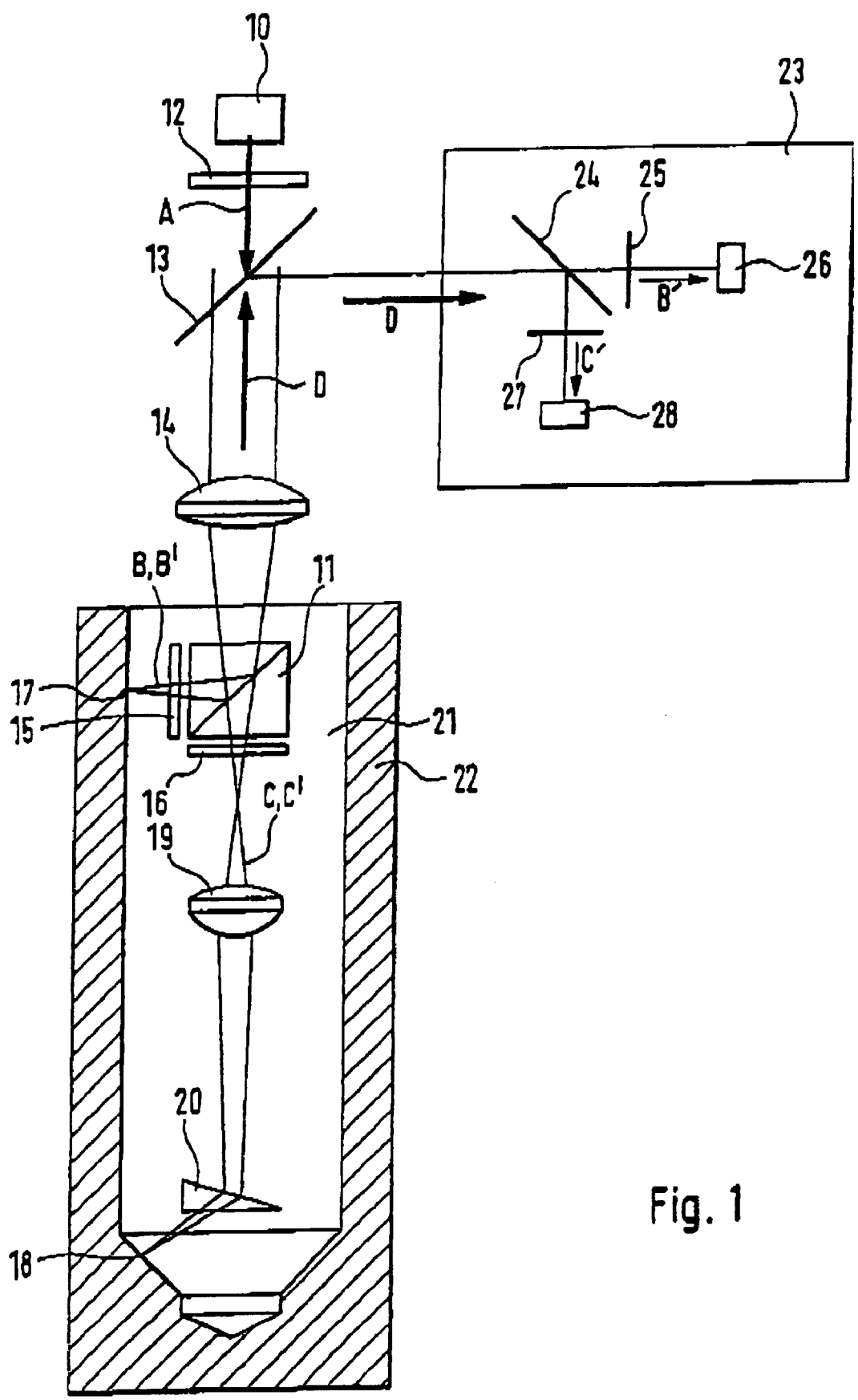
FIG. 1 is a schematic layout of an interferometric measuring system arranged in accordance with our invention for measuring compound surfaces of a test object.

An exemplary interferometric measuring system 10 as shown in FIG. 1 includes an interferometer 12 arranged generally in a Twyman-Green configuration and mounted on a multi-axis stage assembly 14. Also mounted on the multi-axis stage assembly 14 as a part of the interferometer 12 is a multi-beam probe 16 that is adapted for measuring compound surfaces 22, 24, 26, and 28 of a test object 20. A rotary chuck 32 mounts the test object 20. A base 34 supports both the multi-axis stage assembly 14 and the rotary chuck 32 for relating relative motions between the multi-beam probe 16 and the test object 20.

The multi-axis stage assembly 14 preferably translates in two orthogonal directions X and Z via mechanical crossed roller bearing stages 36 and 38 driven by respective motor actuators 40 and 42. Both of the motor actuators 40 and 42 are preferably brushless, slotless DC motors with integral encoders. The multi-beam probe 16 is moved by the multi-axis stage assembly 14 along a desired motion profile under the programmable direction of a microcomputer 44.

The multi-beam probe 16 is preferably mounted from a kinematic bracket 46 with a magnetic preload that allows the probe 16 to be removed and reinserted or replaced while maintaining the original alignment. The rotary chuck 32 mounting the test object 20 is preferably a hydraulic expansion chuck rotatable about an axis 52 on an air bearing spindle 48 powered by a direct-drive brushless DC motor 50 with an integral high-resolution encoder. Quadrature signals from the spindle encoder are used to clock data acquisition. Residual tilt and decenter mounting errors can be removed by software analysis of probe measurements.

The base 34 supporting both the multi-axis stage assembly 14 for the probe 16 and the rotary chuck 32 for the test object 20 is preferably made of granite and includes a riser (not shown) on which the multi-axis stage assembly 14 is supported. The rotary chuck 32 is mounted in a hole through the base 34. The granite structure of the base 34 is integrated into a cradle (not shown) supported by a pneumatic isolation frame (also not shown) for increased immunity from external vibration sources. The rotational axis 52 of the rotary chuck 32 preferably extends parallel with the Z axis of motion of the multi-stage assembly 14.

Within the interferometer 12, a distributed feedback (DFB) solid-state laser 56 provides a source of coherent light, preferably within the near-infrared range of wavelengths (e.g., 1550 nm). Of course, other lasers could be used in different wavelength ranges or in combinations of more than one primary wavelength. The choice optical source depends on the surface characteristics (e.g., roughness and reflectivity) of the test object 20; the type of interferometry employed; and the cost, reliability, and convenience of use.

A light beam 58 emitted by the laser 56 is collimated by lens assembly 60 and is divided by a beamsplitter cube 62 into a measuring beam 64 and a reference beam 66. The measuring beam 64 propagates through a measuring arm 68 that includes the multi-beam probe 16, and the reference beam 66 propagates through a reference arm 70. A folding mirror 72 within the reference arm 70 directs the reference beam 66 to a reflective reference optic 74. Although depicted as reflecting a single on-axis ray, the reflective reference optic 74 is preferably arranged to simulate optics of the multi-beam probe 16 to match optical experiences of a range of rays surrounding the optical axis between the measuring and reference arms 68 and 70.

Figure 2:
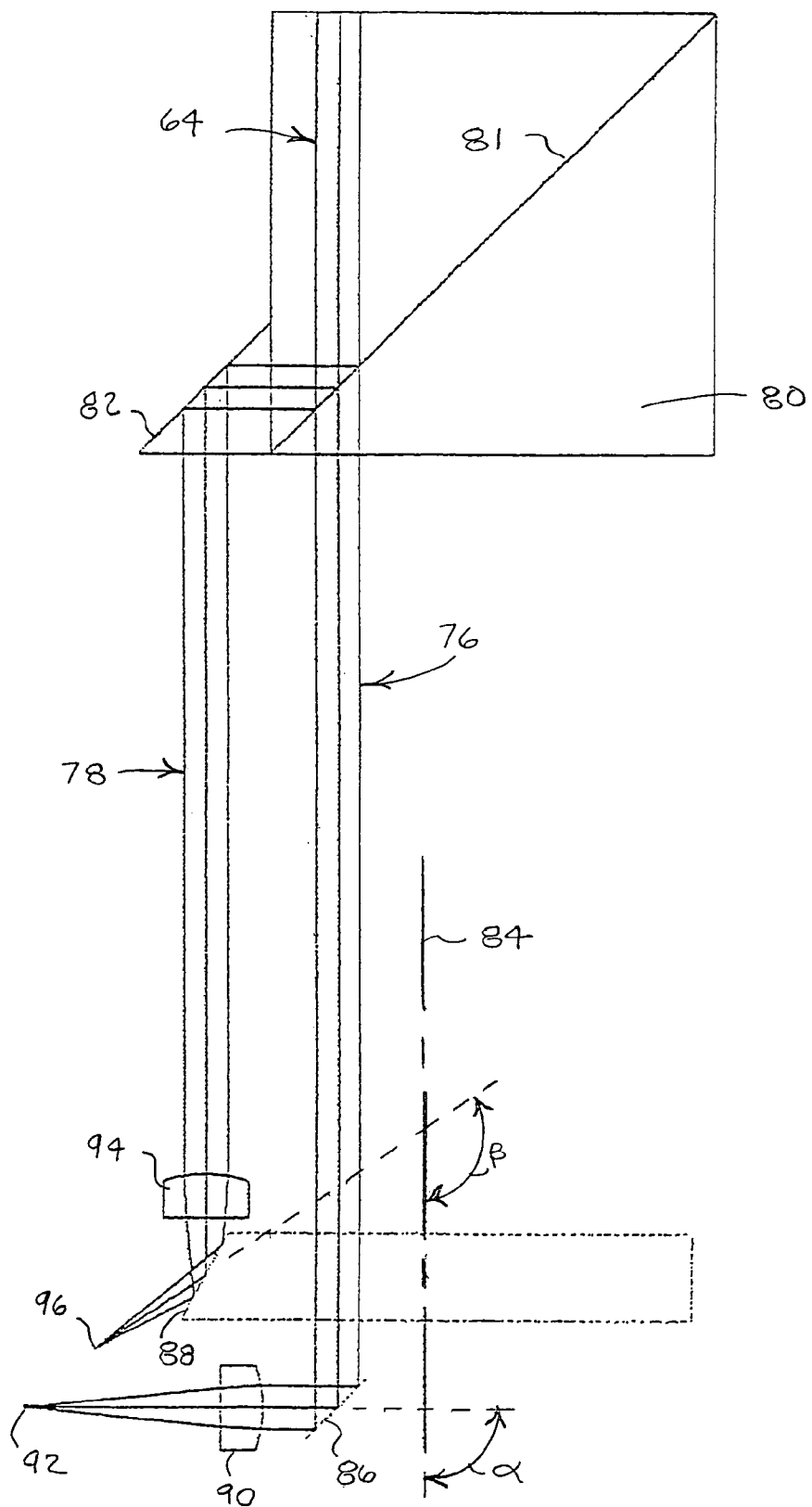
FIG. 2 is a diagram showing an optical layout for a new multi-beam probe that can be used in the interferometric system.
Figure 3:
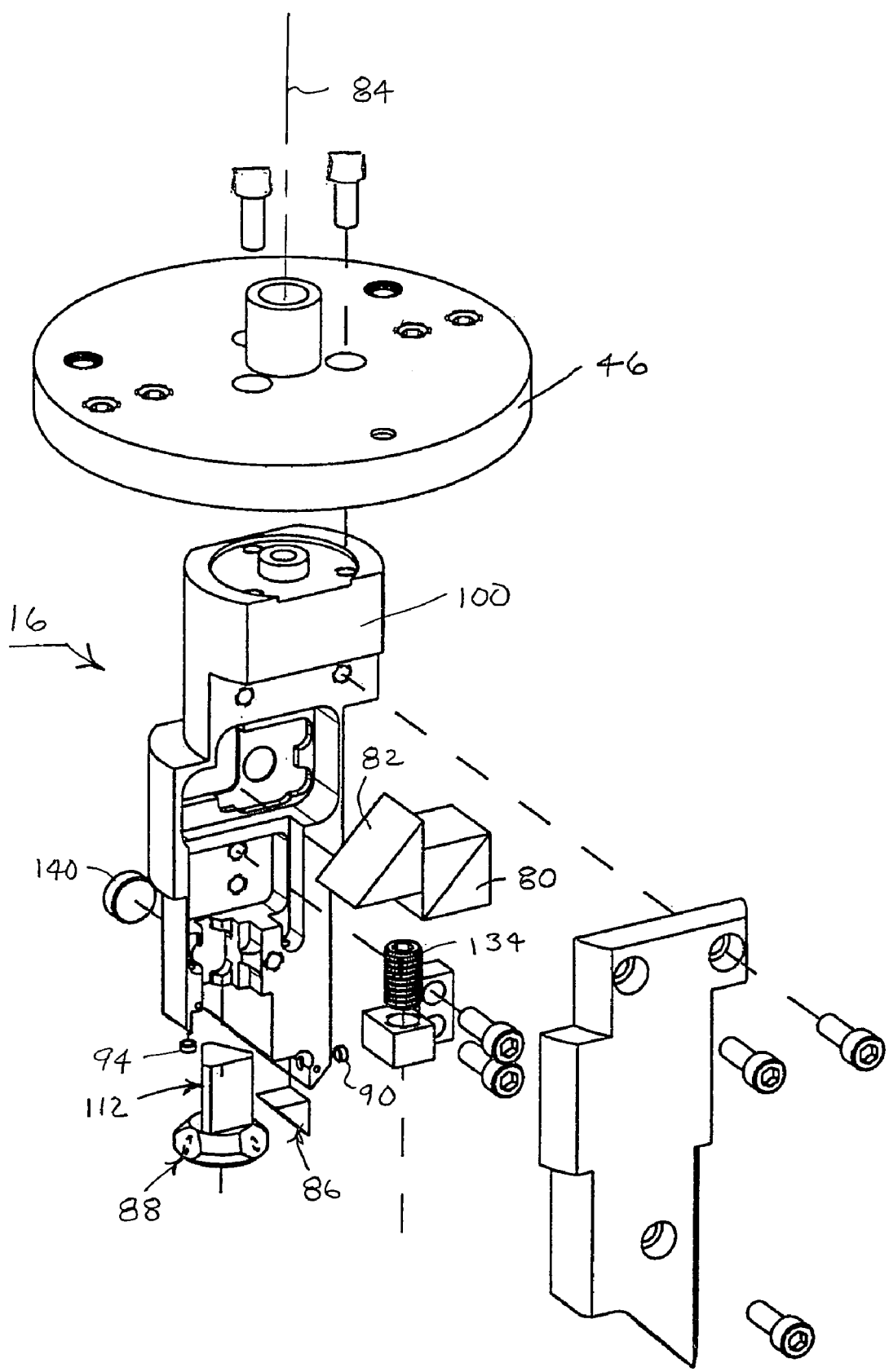
FIG. 3 is an exploded view of an exemplary multi-beam probe showing an assembly of components within the probe.
Figure 4:
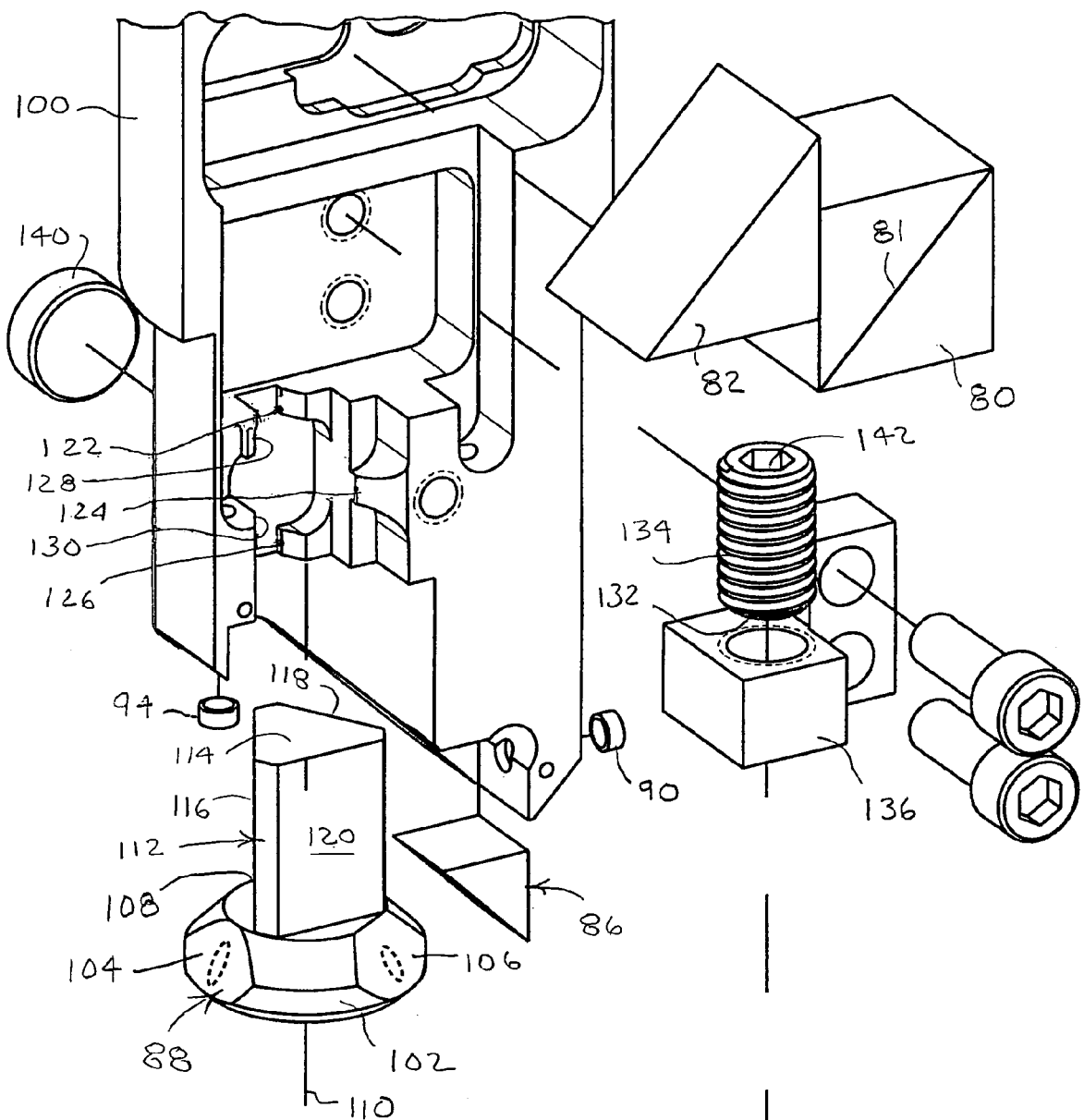
FIG. 4 is an enlarged exploded view of the multi-beam probe broken away to better show components at the bottom of the probe.

The measuring beam 64 propagates through the multi-beam probe 16, which is shown in varying detail by FIGS. 2–4. In the largely schematic optical layout of the multi-beam probe 16 shown in FIG. 2, the measuring beam 64, which is depicted by three parallel rays to portray focusing functions, is divided into first and second measuring beams 76 and 78 by a beamsplitter cube 80. The first measuring beam 76 transmits directly through the beamsplitter cube 80, and the second measuring beam 78 reflects from a partially reflective surface 81 of the beamsplitter cube 80. Preferably, the beamsplitter cube 80 is 50% transmissive and 50% reflective, although other distributions are possible to optimize a distribution of optical power between the two measuring beams 76 and 78. A directional optic 82, which can take the form of a folding mirror or prism as illustrated, reorients the second measuring beam 78 parallel to the first measuring beam 76 along a common reference axis 84 of the multi-beam probe 16.

A first beam deflector 86 orients the first measuring beam 76 at a fixed angle "α" with respect to the reference axis 84 (see also FIG. 1). A second beam deflector 88 reorients the second measuring beam 78 at a variable angle "β" with respect to the reference axis 84. A first focusing optic 90 following the first beam deflector 86 focuses the first measuring beam 76 to a focal point 92. A second focusing optic 94 in advance of the second beam deflector 88 focuses the second measuring beam 78 to a focal point 96. The two focusing optics 90 and 94 can be located before or after the beam deflectors 86 and 88 for converging the measuring beams 76 and 78 to their focal points 92 and 96, which are preferably at equal optical distances from their split within the beamsplitter block 80.

Figure 5:
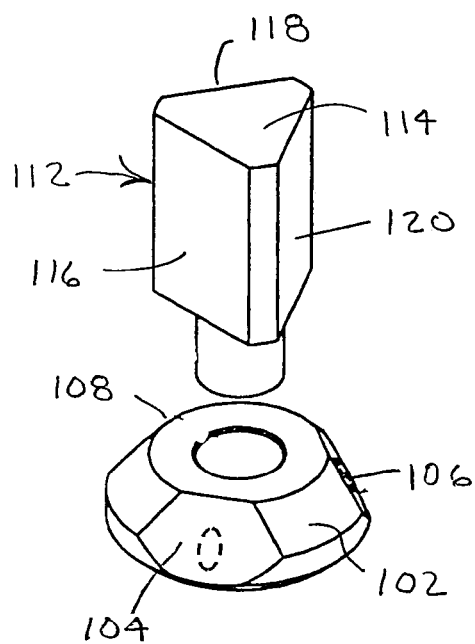
FIG. 5 is an exploded perspective view of a beam deflector and indexing post for deflecting a measuring beam at prescribed angles from the multi-beam probe.
Figure 6:
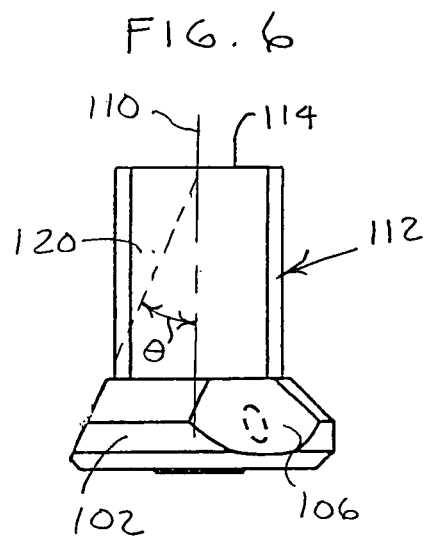
FIG. 6 is a side view of the beam deflector and indexing post.

As is apparent in the more detailed exploded views of FIGS. 3 and 4, the multi-beam probe 16 includes a probe body 100 that supports the various probe components including the beamsplitter cube 80, the directional optic 82, the first and second beam deflectors 86 and 88, and the first and second focusing optics 90 and 94. The first beam deflector 86 is depicted as a prism but could also be arranged as a folding mirror or other directional optic capable of altering beam direction. The second beam deflector 88, which is separately illustrated in FIGS. 5 and 6, is preferably formed as a facet 104 or other reflective surface on a deflector body 102. The deflector body 102, which is depicted in the form of a disk, can support a single facet 104 or a plurality of facets 104, 106, and 108 distributed around an indexing axis 110. Each of the facets 104, 106, and 108 is inclined to the indexing axis 110 through an angle "θ" by a different amount.

An indexing post 112 is connected to the deflector body 102, such as by press fitting, and provides for mounting and remounting the deflector body 102 within the probe body 100 at a set of predetermined positions. The illustrated post 112 has a regular prismatic shape with a triangular base 114 and three rectangular sides 116, 118, and 120. Six contact points 122, 124, 126, 128, 130, and 132 provide a kinematic mount for supporting the indexing post 112 within the probe body 100. Although many other configurations can be used, the illustrated probe body 100 contains three of the contact points 122, 124, and 126 for engaging one of the rectangular sides 118 of the indexing post 112 and two of the contact points 128 and 130 for engaging another rectangular side 116 of the indexing post 112. A set screw 134 threaded within a block 136 that is fastened to the probe body 100 contains the last contact point 132 for engaging the triangular base 114.

The indexing post 112 is preferably made of a ferromagnetic material, and permanent magnets 140 and 142 hold the indexing post 112 in place within the probe body 100. The permanent magnet 140 is positioned in the probe body 100 for drawing the indexing post 112 against the five contact points 122, 124, 126, 128, and 130 that engage the adjacent sides 116 and 118 of the indexing post. The permanent magnet 142 is located within the set screw 134 for drawing the triangular base 114 against the set screw 134. A position of the indexing post 112 and the deflector body 102 along the reference axis 84 can be adjusted by turning the set screw 134.

The six contact points 122, 124, 126, 128, 130, and 132 forming the kinematic mount together with the indexing post 112 function as an indexing mechanism for the second beam deflector 88. The indexing post 112, which is aligned with the indexing axis 110, can be mounted in any one of three angular orientations within the probe body 100, each engaging a different pairing of adjacent sides 118 and 120, 120 and 116, or 116 and 118 with the probe body contact points 122, 124, 126, 128, and 130. Each of the different angular orientations presents a different one of the three facets 104, 106, or 108 to the second measuring beam 78 for deflecting the second measuring beam 78 through a different variable angle "β".

For indexing the second beam deflector 88, the indexing post 112 together with the deflector body 102 is pulled out of the probe body 100 along the common direction of the reference axis 84 and the indexing axis 110. A pull sufficiently large to overcome the pull of the permanent magnets 140 and 142 is required. Once disengaged, the indexing post 112 and deflector body 102 are rotated about the indexing axis 110 through an increment of 120 degrees, and the indexing post 112 is reinserted into the probe body 100. In the angularly indexed position recaptured by the magnets 140 and 142, another of the reflective facets 106 or 108 intercepts the second measuring beam 78 for inclining the second measuring beam 78 through a different angle "β". Any one of the three reflective facets 104, 106, or 108 can intercept the second measuring beam 78 in this way.

For measuring the compound test surface 22 of the test object 20, the first measuring beam 76 is reflected by the first beam deflector 86 through the fixed angle "α" (e.g., 90 degrees) with respect to the reference axis 84 at an orientation that is normal to the compound test surface 22. The reflected beam converges to the focal point 92. The multi-axis stage assembly 14 relatively first moves the focal point 92 to a position on the compound surface 22 at normal incidence so that the incident beam is retroreflected from the compound surface 22. A combination of test object rotation by the rotary chuck 32 and probe translation by the multi-axis stage assembly 14 provides for scanning an area of the test surface 22. Meanwhile, the focal point 96 of the second measuring beam 78 is maintained out of contact with the remaining compound surfaces 24, 26, and 28.

Retroreflection from the compound test surface 22 returns the first measuring beam 76 through the multi-beam probe 16 of the measuring arm 68 to the beamsplitter 62 where the first measuring beam 76 is recombined with the reference beam 66 returning from the reference arm 70. A confocal optical system including an imaging optic 146 images the combined measuring beam 76 and reference beam 66 onto a detector 150 whose limited active area functions as an aperture stop. A point of focus of the imaging optic 146 on the detector 150 is preferably conjugate to both focal points 92 and 96. However, the aperture stop 148 blocks any light from the second measuring beam 78 that is not retroreflected from the focal point 92. Accordingly, an interference signal extracted from the detector 150 is formed between the reference beam 66 and the first measuring beam 76 that is focused onto the compound surface 22. Alternatively, a separate aperture stop could be used in conjunction with an appropriately positioned imaging optic so that the conjugate point of focal points 92 and 96 is located in the aperture stop.

The compound surface 24 is similarly measured by positioning the focal point 96 of the second measuring beam 78 onto the compound surface 24. The second beam deflector 88 orients the second measuring beam 78 at a variable angle "β" normal to the compound surface 24. The multi-axis stage 14 translates the focal point 96 in the orthogonal X and Z directions while the rotary chuck 32 rotates the test object 20 around the rotational axis 52 for scanning an area of the compound surface 24. Meanwhile, the focal point 92 of the first measuring beam 76 is not located on any of the compound surfaces 22, 24, 26, or 28. An interference signal received at the detector 150 between the reference beam 66 and the second measuring beam 78 describes the compound surface 24.

The measurements of the two compound surfaces 22 and 24 can be associated by relating the two measuring beams 76 and 78 to each other. Preferably, the first and second measuring beams 76 and 78 are both inclined within a common axial plane of the reference axis 84 for relating rotational positions of the two measuring beams 76 and 78 about the reference axis 84. A datum axis of the test object 20 can be defined by measurements of the first measuring beam 76 for describing geometric characteristics (e.g., runout and concentricity) of the compound surface 22 independently of the rotational axis 52. By relating the second measuring beam 78 to the first measuring beam 76 as suggested, the geometric characteristics of the compound surface 24 can be described with respect to the same datum axis.

The second measuring beam 78 can also be used for measuring the remaining compound surfaces 26 and 28. Different variable inclination angles "β" are required for this purpose. This can be achieved in a variety of ways. However, as illustrated particularly by FIGS. 3 and 4, the second beam deflector 88 is indexable for interrupting the second measuring beam 78 with another reflective facet 106 or 108 that is inclined by a different amount with respect to the indexing axis 110. The beam deflector body 102 together with the indexing post 112 is withdrawn from the probe body 100, rotated by 120 degrees about the indexing axis, and reinserted into the probe 100 in a angular position that presents one of the other facets 106 or 108 to the second measuring beam 78.

The other facet 106 or 108 inclines the second measuring beam 78 normal to one of the remaining compound surfaces 26 or 28. Preferably, the second measuring beam 78 is inclined by the facet 106 or 108 in the same axial plane as the measuring beam 78 was inclined by the facet 104. Any differences between planes of inclination can be recorded for an initial calibration of the probe 16. However, the indexing mechanism including the indexing post 112 and the contact points 122, 124, 126, 128, 130, and 132 maintain sufficient accuracy to provide repeatable measures from each of the three indexing positions.

Although shown as indexable between three indexing positions, the second beam deflector could be arranged with more or less indexing positions. For example, five reflective facets could be formed on the deflector body with the indexing post formed as a regular prism with a pentagonal base. The contact points of the probe body 100 could be readily arranged to accommodate the change. The second beam deflector could also be made with a single reflective facet, and different second beam deflectors could be substituted to vary the inclination angle "β". Of course, such substitutions could also be made between second beam deflectors with more than one reflective facet.

Figure 7:
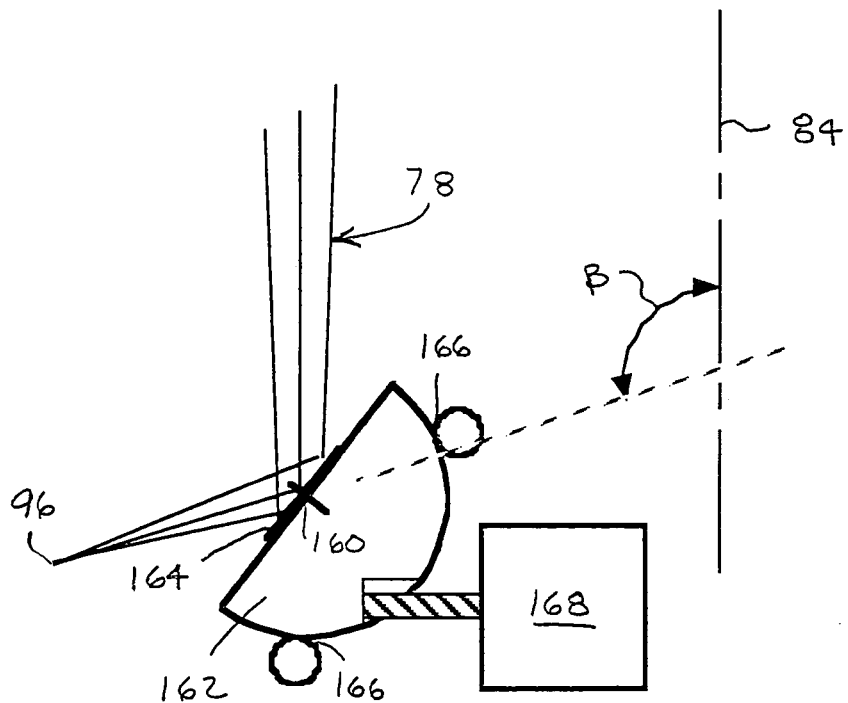
FIG. 7 is a diagram of an alternative beam deflector mounted for rotation about an alternative indexing axis.

In the embodiment of FIGS. 3–6, the indexing axis 110 is aligned parallel with the reference axis 84 of the probe 16. However, an alternative indexing axis 160 could be differently oriented, such as perpendicular to the reference axis 84 as shown schematically in FIG. 7. The indexing axis 160 of FIG. 7 also extends normal to an axial plane of the reference axis 84 that includes the focal point 92 of the first measuring beam 76.

A single reflective facet 164 is formed on a deflector body 162, which is shaped as a half-cylinder to provide a continuous indexing function. The deflector body 162 is rotatable about the indexing axis 160 on a set of contact points 166 that can be associated with permanent magnets, electromagnets, or other securing devices for holding the deflector body 162 in place. An actuator 168, such as a small servo drive or piezoelectric stack, can provide for rotating the deflector body 162 for varying the inclination angle "β" with respect to the reference axis. In the direction of rotation around the indexing axis 160, the second measuring beam 78 remains nominally in the same axial plane as the first measuring beam 76, which can simplify calibrations between the beams 76 and 78. Since the reflective facet 164 is centered with respect to the indexing axis 160, the second measuring beam 78 remains centered on the reflective facet 164 despite changes in inclination angle "β".

The indexing rotation of the deflector body 162 can take place automatically, such as by the illustrated motor 168, or manually, such as by a set screw. In addition, the deflector body 162 is indexable, either through a continuous range of inclination angles "β" or through a set of incrementally varying inclination angles "β".

In the embodiments described thus far, just the second measuring beam 78 is angularly adjustable within the probe. Although we prefer to provide a fixed reference, similar adjustments could also be made to the first measuring beam 76. More than two measuring beams could also be accommodated as either fixed or angularly adjustable beams. The relative motions between the probe 16 and the test object 20 can be divided in various combinations. For example, the test object 20 could be translated as well as rotated.

Although the second measuring beam 78 is preferably reoriented by reflection, beam deflectors could also be formed by diffractive or refractive optics capable of bending light. The probe 16 in its various manifestations could also be used in different interferometric configurations. Co-pending U.S. patent application Ser. No. 10/277,798, entitled "Two-wavelength Confocal Interferometer for Measuring Multiple Surfaces", describes such an arrangement.

We claim:

1. A multi-beam probe for interferometrically measuring compound surfaces of a test object comprising:
    a probe body having a reference axis;
    a beamsplitter that divides a beam into first and second measuring beams propagating within the probe body;
    a first deflector that directs the first measuring beam from the probe body at a given angle with respect to the reference axis for measuring one of the compound surfaces;
    a second deflector that directs the second measuring beam from the probe body at one of a plurality of variable angles with respect to the reference axis for measuring other of the compound surfaces; and
    a beam adjuster associated with the second deflector that changes the variable angle between:
    a first variable angle at which the second measuring beam is directed from the probe body for measuring a second of the compound surfaces, and
    a second variable angle at which the second measuring beam is directed from the probe body for measuring a third of the compound surfaces.

2. The probe of claim 1 in which the beam adjuster includes an indexing mechanism for changing the variable angles.

3. The probe of claim 2 in which the indexing mechanism intermittently indexes the second deflector between variable angles by a discrete increment.

4. The probe of claim 2 in which the indexing mechanism continuously indexes the second deflector between variable angles through a continuum of increments.

5. The probe of claim 2 in which the second deflector includes a deflector body that is rotatable about an indexing axis for successively deflecting the second measuring beam through the first and second variable angles.

6. The probe of claim 5 in which the indexing axis extends parallel to the reference axis of the probe.

7. The probe of claim 5 in which the indexing axis extends perpendicular to the reference axis of the probe.

8. The probe of claim 7 in which the variable angle is adjustable within an axial plane that includes the reference axis.

9. The probe of claim 8 in which the first and second variable angles are true size in the axial plane.

10. The probe of claim 1 in which the second deflector includes a reflective facet for reflecting the second measuring beam through one of the variable angles.

11. The probe of claim 10 in which the reflective facet is one of a plurality of reflective facets supported on an adjuster body.

12. The probe of claim 11 in which the plurality of reflective facets includes a first facet for reflecting the second measuring beam through the first variable angle and a second facet for reflecting the second measuring beam through the second variable angle.

13. The probe of claim 12 in which the beam adjuster moves the adjuster body between successive positions at which the second measuring beam is reflected from the first and second reflective facets.

14. The probe of claim 13 in which the plurality of reflective facets includes a third facet for reflecting the second measuring beam through a third variable angle, and the beam adjuster further moves the adjuster body through another successive position at which the second measuring beam is reflected from the third reflective facet.

15. The probe of claim 14 in which the facets are equally spaced around a rotational axis of the adjuster body, and the beam adjuster rotates the adjuster body between the successive positions.

16. The probe of claim 1 in which the given angle at which the first deflector directs the first measuring beam from the probe body is a fixed angle.

17. The probe of claim 1 further comprising focusing optics associated with the first and second measuring beams for focusing the first and second beams on the compound surfaces of the test object.

18. The probe of claim 17 in which the focusing optics are located between the beamsplitter and the first and second deflectors within the probe body.

19. A multi-beam probe for interferometrically measuring compound surfaces of a test object comprising:
  a probe body having separate optical pathways for propagating first and second measuring beams;
  focusing optics that separately focus the first and second measuring beams beyond the probe body for measuring different compound surfaces of the test object;
  an adjustable beam deflector that inclines the second measuring beam with respect to the first measuring beam through a range of angles for measuring more than one of the compound surfaces with the second measuring beam;
  the adjustable beam deflector includes a deflector body that is movable between successive positions that incline the second measuring beam through different angles with respect to the first measuring beam; and
  the deflector body supporting a plurality of reflective facets that are inclined with respect to each other, each of the facets providing for reflecting the second measuring beam at one of the different angles.

20. The probe of claim 19 in which the deflector body is supported in a kinematic mount for constraining motion of the deflector body in three orthogonal directions of rotation and three orthogonal directions of translation.

21. The probe of claim 20 in which one of the constraints of motion is suspended to permit the deflector body to be indexed between positions at which different reflective facets reflect the second measuring beam.

22. The probe of claim 21 in which the deflector body is rotatable about an indexing axis for presenting the facets to the second measuring beam in succession for successively measuring the compound surfaces.

23. The probe of claim 22 in which the deflector body is a disk that is rotatable about the indexing axis, and the facets are formed as reflective surfaces of the disk.

24. A multi-beam probe for interferometrically measuring compound surfaces of a test object comprising:
  a probe body having separate optical pathways for propagating first and second measuring beams;
  focusing optics that separately focus the first and second measuring beams beyond the probe body for measuring different compound surfaces of the test object;
  an adjustable beam deflector that inclines the second measuring beam with respect to the first measuring beam through a range of angles for measuring more than one of the compound surfaces with the second measuring beam;
  the first and second measuring beams being arranged to propagate through the probe body with respect to a reference axis;
  a fixed deflector that inclines the first measuring beam with respect to the reference axis; and
  the first measuring beam being inclined through a fixed angle in an axial plane that includes the reference axis, and the second measuring beam being inclinable through the range of angles in the same axial plane.

25. A multi-beam probe for interferometrically measuring compound surfaces of a test object comprising:
  a probe body having separate optical pathways for propagating first and second measuring beams;
  focusing optics that separately focus the first and second measuring beams beyond the probe body for measuring different compound surfaces of the test object;
  an adjustable beam deflector that inclines the second measuring beam with respect to the first measuring beam through a range of angles for measuring more than one of the compound surfaces with the second measuring beam; and
  the adjustable beam deflector including a deflector body that is removable from the probe body and re-mountable within the probe body in a different angular orientation for changing the inclination of second measuring beam through different angles with respect to the first measuring beam.

26. The probe of claim 25 in which the deflector body is supported in a kinematic mount for constraining motion of the deflector body in three orthogonal directions of rotation and three orthogonal directions of translation, and one of the constraints of motion is suspended to permit the deflector body to be removed from the probe body.

27. The probe of claim 26 in which the deflector body supports a plurality of reflective facets that are inclined with respect to each other, and the deflector body is re-mountable within the probe body in different orientations that present different reflective facets to the second measuring beam.

28. A system for interferometrically measuring compound rotational surfaces of a test object comprising:
  a rotatable test object support for rotating the test object about a rotational axis;
  a multi-beam probe for focusing first and second measuring beams on different compound rotational surfaces of the test object;
  beam directional optics within the multi-beam probe for inclining the first and second measuring beams with respect to the rotational axis for measuring first and second of the compound rotational surfaces; and
  an adjustment mechanism within the multi-beam probe that varies the inclination of the second measuring beam with respect to the rotational axis for measuring a third of the compound rotational surfaces.

29. The system of claim 28 further comprising a processor that processes information from the first measuring beam about the first compound rotational surface for determining a datum axis of the test object and that processes information from the second measuring beam for referencing information about the second and third compound rotational surfaces with respect to the datum axis.

30. The system of claim 29 in which the datum axis differs from the rotational axis.

31. The system of claim 29 in which the processor compares phase information between the first and second measuring beams and a common reference beam.

32. The system of claim 28 further comprising focusing optics that focus the first measuring beam on the first compound rotational surface at normal incidence and that successively focus the second measuring beam on the second and third compound rotational surfaces at normal incidence.

33. The system of claim 28 in which the adjustment mechanism includes an indexing mechanism for changing the inclination of the second measuring beam with respect to the rotational axis.

34. The system of claim 33 in which the indexing mechanism changes the inclination of the second measuring beam with respect to the rotational axis within a plane that includes the rotational axis.

35. The system of claim 34 in which the indexing mechanism changes the inclination of the second measuring beam with respect to the rotational axis by a discrete increment.

36. The system of claim 28 in which the beam directional optics include:
   a first deflector that directs the first measuring beam from the multi-beam probe at a given angle with respect to the rotational axis for measuring the first compound rotational surface, and
   a second deflector that directs the second measuring beam from the multi-beam probe at one of a plurality of variable angles with respect to the rotational axis for successively measuring the second and third compound rotational surfaces.

37. The system of claim 36 in which the adjustment mechanism changes the variable angle between:
   a first variable angle at which the second measuring beam is directed from the multi-beam probe for measuring the second compound rotational surface, and
   a second variable angle at which the second measuring beam is directed from the multi-beam probe for measuring the third compound rotational surface.

38. The system of claim 28 further comprising a scanning mechanism that relatively moves the multi-beam probe with respect to the test object for scanning areas of the compound test surfaces.

39. The system of claim 38 in which the scanning mechanism includes a first drive for relatively moving the probe parallel to the rotational axis of the test object and a second drive for relatively moving the probe perpendicular to the rotational axis of the test object.

40. The system of claim 39 in which the relative motions of the probe are within a common axial plane in which the first and second measuring beams are relatively inclined.

* * * * *